United States Patent [19]

Bakker

[11] 3,774,751

[45] Nov. 27, 1973

[54] CONVEYOR WITH SELECTIVE INTERMEDIATE DROPOUT

[76] Inventor: Donavon L. Bakker, Rt. 1-Box 7, Fort Atkinson, Wis. 53538

[22] Filed: Oct. 24, 1972

[21] Appl. No.: 300,107

[52] U.S. Cl.............. 198/169, 119/56 R, 198/205
[51] Int. Cl..... A01k 5/00, B65g 15/60, B65g 19/08
[58] Field of Search.................. 198/66, 169, 205; 119/56 R

[56] References Cited
UNITED STATES PATENTS
3,351,180   11/1967   Herzog.............................. 198/205

Primary Examiner—Edward A. Sroka
Attorney—Claude W. Lowe et al.

[57] ABSTRACT

A conveyor trough is provided with a longitudinally slidable intermediate section which, when moved to the open condition, permits conveyed material to drop out of the conveyor trough. The return flight of the conveyor is protected from the dropped-out material. Means provided for releasably locking the intermediate section in the closed condition as well as in the open condition.

6 Claims, 6 Drawing Figures

PATENTED NOV 27 1973 3,774,751
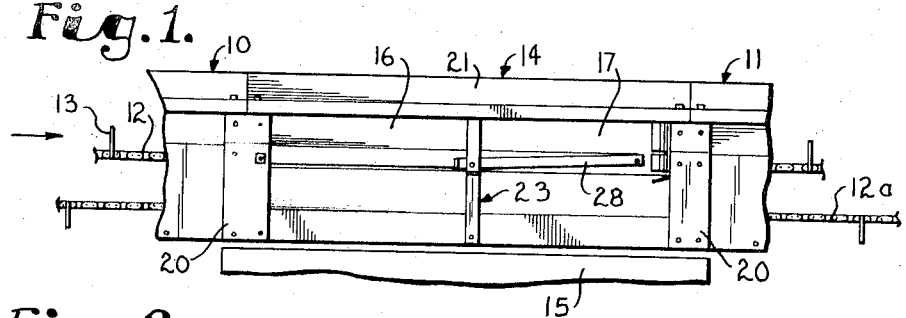
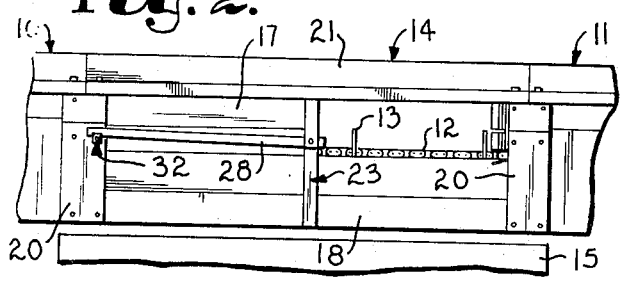
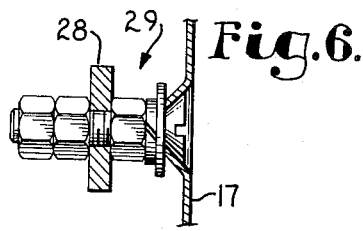
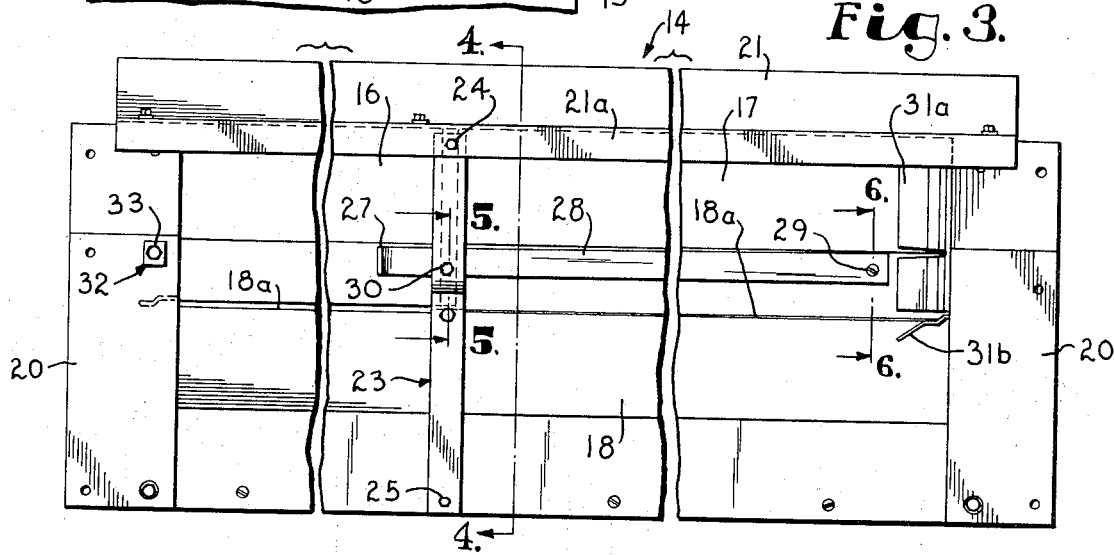
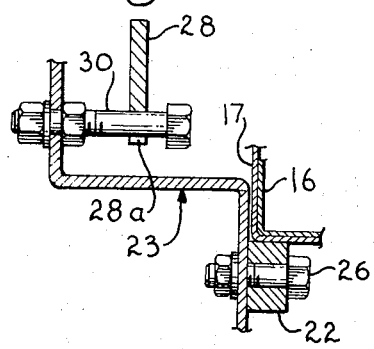
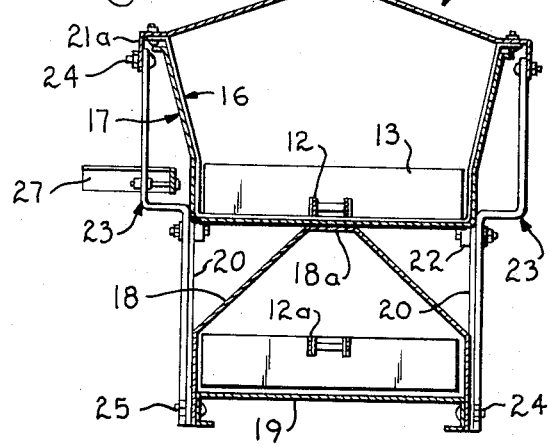

CONVEYOR WITH SELECTIVE INTERMEDIATE DROPOUT

BACKGROUND AND SUMMARY OF THE INVENTION

In the use of conveyors, particularly drag chain type conveyors of the single chain type which are used in handling livestock feeds, it can be advantageous in some installations to provide for discharge of material from one or more points along the conveyor rather than always at the discharge end. However, such conveyors as heretofore constructed do not lend themselves to this feature. This is primarily because of the fact that the return flight of the conveyor passes directly below the bottom pan of the conveyor trough. If a discharge opening were provided in the bottom pan, much of the material dropped directly through such opening would, of necessity, strike the return flight and either collect thereon or on its support, or be deflected away from the intended discharge zone.

One of the principal objects of the present invention is to provide an intermediate dropout section for conveyors of the endless chain type in which the problems noted above are overcome, and which successfully provides for discharge of material at an intermediate point along the length of the conveyor.

Another object of the invention is to provide an intermediate dropout section in which the material being conveyed is substantially equally divided to opposite sides of the conveyor center line on the dropout of the material.

A further object is to provide an intermediate dropout section in which the conveyor chain is supported for movement through the dropout section on substantially the same level as it is in the entrance and departure sections of the conveyor adjacent the dropout section.

Other objects are to provide an arrangement of the character described in which the desired results are achieved without requiring close manufacturing tolerances and precision fit of parts, which is simple to install and operate, and which requires little, if any, maintenance attention during use.

Other and further objects of the invention together with the features of nevelty appurtenant thereto will appear in the course of the following description.

DETAILED DESCRIPTION

In the accompanying drawings, which form a part of the specification and are to be read in conjunction therewith, and in which like reference numerals indicate like parts in the various views:

FIG. 1 is a side elevational view of a fragmentary section of a complete conveyor showing the preferred form of the intermediate dropout assembly according to the present invention incorporated therein;

FIG. 2 is a view generally similar to FIG. 1, but showing the intermediate dropout assembly with the movable trough section thereof in the open condition;

FIG. 3 is a side elevational view on an enlarged scale of the intermediate dropout assembly alone, the break lines indicating interrupted length;

FIG. 4 is a sectional view taken generally along line 4—4 of FIG. 3 in the direction of the arrows;

FIG. 5 is a sectional view, on a greatly enlarged scale, taken along line 5—5 of FIG. 3 in the direction of the arrows; and FIG. 6 is a fragmentary sectional view, on a greatly enlarged scale, taken along line 6—6 of FIG. 3 in the direction of the arrows.

Referring now to the drawings, and initially to FIG. 1, reference numerals 10 and 11 indicate respectively longitudinally aligned sections of a typical endless single chain conveyor assembly. The upper part of each section 10 or 11 comprises a generally U-shaped trough over the bottom of which rides a chain 12 carrying a plurality of drag slats 13. The chain is driven by any appropriate means (not shown) to move material in the general direction shown by the arrow. The lower section of the conveyor comprises an enclosed space in which the return flight 12a of the chain is housed. The general configuration of a typical conveyor of this type is shown in my pending application, Ser. No. 222,822, filed Feb. 2, 1972, and reference to that application for further details may be had if desired.

The conveyor sections 10 and 11 are spaced from one another and are interconnected by the intermediate dropout assembly indicated generally by reference numeral 14. This section can be located over a feed bunk or other receptacle 15 in which it is desired to deposit material from the conveyor from time to time.

Two of the basic components of the intermediate dropout assembly 14 are the generally end-to-end related trough sections 16,17 which in the normal conveying condition of the trough form continuations of and cooperate to provide a conveying path for the upper conveying flight 12. As best seen in FIG. 4, the trough sections 17 and 16 are designed to interfit with one another in a telescopic fashion, the trough 17 being of somewhat greater dimensions than the trough 16 so that it may freely fit around and slide along the exterior of trough section 16. For purposes of this application, the trough section 16 will be referred to as the stationary trough section and the section 17 as the movable section. Each section is, as indicated, generally U-shaped in configuration and conforms with the general shape of the troughs 10 and 11.

Located beneath the trough sections 16, 17 is an inverted, generally V-shaped deflector pan 18 which has a flat section 18a underlying and continuing from one end of the combined trough sections 16, 17 to the other, and two downwardly and outwardly inclined walls which terminate in depending vertical portions. The vertical portions are interconnected at the bottom by a pan 19 which provides a running support for the return flight 12a.

The deflector 18, pan 19 and the stationary section 16 are interconnected with the splice plates 20 which also serve to splice the dropout assembly into the conveyor itself. The connections are made by ordinary bolts or other fasteners. The splice plates are interconnected with the sections 10, 11 and are best seen in FIG. 4. A cover 21 overlies the trough sections and is secured to outwardly projecting flanges on the stationary section 16.

Referring again to FIG. 3, it will be noted that the exterior bottom of the trough section 16 is spaced above the top of the deflector 18 (an offset flange 16a providing the support at one end) in order to provide a gap within which the bottom pan of the movable section 17 can slide. The section 17 otherwise is guided by slide blocks 22, the details of which will now be described.

Referring in particular to FIGS. 4 and 5, it will be noted that secured on either side of the assembly is a generally Z-shaped guide member 23. Each guide member is secured to and supported from the top cover 21, being connected thereto by a depending flange 12a and the fasteners 24. The lower end of the guide member is secured to the bottom edge of the deflector 18 as by fastener 25.

The guide members 23 serve to support the slide blocks 22 to which reference has been earlier made. Referring again to FIGS. 4 and 5, it will been that each slide block 22 is secured adjacent the inside of the guide member by a bolt and nut assembly 26. The vertical portion of each guide member above the bolt assemblies serves as a side guide for the movable trough section 17, loosely confining it between the stationary trough section and the guide member.

The opening and closing of the movable trough section is accomplished through a manual hand grip 27, which is formed as an outturned flange on an elongate bar 28 extending along one side of the movable trough section 17. The other end bar 28 is pivotally secured to the wall of the movable section by the bolt assembly 29 (see FIG. 6).

Referring to FIG. 5, the underside of the elongate bar 28 is formed with a notch or recess 28a which is adapted to engage with a horizontally extending pin 30 secured to and extending from the inside of the upper portion of guide member 23. It will be observed that the relative elevations of the pivot connection 29 and the latch pin 30 are such that the latter is somewhat lower. This is to permit the bar 28 to remain in a horizontal plane during movement once the latch has been disengaged.

It will be evident that the manual operating assembly just described can be placed on either side of the unit, or that such assemblies could be placed on both sides. The guide mebers are essentially the same, and all that is required is the attaching of the manual operating assembly to the movable closure and the installation of the latch pin 30.

Referring again to FIG. 3 and to the righthand end of the dropout assembly, the structure includes an end guide for the movable trough section 17, this assembly generally being indicated at 31a and 31b. As seen, guide portion 31b extends on either side of the top of the pan and includes downwardly inclined sections which are adapted to intercept and guide the closure into an aligned condition with the remainder of the conveyor when the latter is in its full forward or closed position. Elements 31a are similarly shaped to guide the side wall portions into the aligned fit with the rest of the conveyor.

A second latching pin assembly 32 is located at the lefthand end of the stationary closure to hold the pivotal bar 28 in the open condition as illustrated in FIG. 2. The assembly is nothing more than a U-shaped member having its inside leg secured to the splice plate with a pin 33 extending inwardly from the outside leg to provide a holding member for the recess 28a in the bar 28.

The operation of the apparatus is believed to be almost self-evident from the description which has preceded. In the closed condition of the dropout assembly, that is, the condition shown in FIGS. 1 and 3, the conveyor chain will operate in its normal fashion to convey material along the trough. When it is desired to make use of the dropout, the movable chute section 17 is moved to the open condition by grasping handle 27, raising it to free the notch 28a from the pin 30, and pulling to the left. Motion is continued until the limit of movement has been reached, at which time the notch can be engaged with the other latching assembly 32 to hold it in the open position against any vibrational influences of the conveyor. The upper conveyor chain 12 continues to move in a horizontal position, being supported on the top 18a of the deflector 18 during its passage through the open section.

It will be evident that as material is brought into the open section, it will fall on either side of the central part of the deflector and will be substantially evenly divided to either side of the center line of the conveyor. Any accidental twisting of the conveyor paddles off the horizontal can be countered by the guide portion 31b which would intercept and return them to the horizontal. Such twisting is unlikely because of the support of the chain of the flat section 18a of the deflector.

Closing of the open dropout zone is accomplished by disengaging the actuating member from the latch assembly and pushing the movable closure to the right until it is seated within the guide assembly 31a, 31b. This coincides with the registry of the notch 28a with pin 30 and, upon lowering of the bar 28, the assembly is again locked in the closed condition.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In combination with an endless conveyor having an upper conveying flight and a return flight below the conveying flight,
    a first stationary trough section having a bottom pan over which the conveyor flight moves for advancing material through the trough,
    a second movable trough section normally extending from and forming a continuation of said first section and also having a bottom pan over which said flight advances material, said second trough section of a size and configuration to interfit with said first trough section upon movement of said second section toward said first section,
    a third stationary trough section forming a continuation of said second section, and
    an elongate support member above said return flight and below and aligned with said second trough section and extending substantially the full length of said second section adjacent the level of said bottom pan whereby to provide support for said conveyor when said second section is out of its normal position, and
    means for shifting the said second section toward said first section thereby to provide for material dropout from the trough on either side of said support.

2. The combination as in claim 1, said support member comprising an inverted trough-like structure with surfaces sloping oppositely downwardly and away from the center line of said trough sections.

3. The combination as in claim 1, including conveyor stabilizing members adjacent the third, stationary trough section and located on opposite sides of the trough center line and operable when necessary to maintain the conveyor in a laterally level condition prior to its entry into the said third section.

4. The combination as in claim 1, including guide members positioned adjacent said third trough section and operable to guide the confronting end of said second moveable trough section into alignment with said first and third sections upon movement of said second section toward said third section.

5. The combination as in claim 1, including means associated with said shifting means for releasably locking said second section in its normal position.

6. The combination as in claim 1, including means associated with said shifting means for releasably locking said second section in an open condition relative to said first and third sections.

* * * * *